US012731323B2

(12) United States Patent
McAllister et al.

(10) Patent No.: US 12,731,323 B2
(45) Date of Patent: Sep. 8, 2026

(54) SYSTEMS AND METHODS FOR DETECTING RAY INTERSECTIONS WITH DISPLACED MICRO-MESHES

(71) Applicant: Advanced Micro Devices, Inc., Santa Clara, CA (US)

(72) Inventors: David Kirk McAllister, Draper, UT (US); Andrew Erin Kensler, Bellevue, WA (US); Holger Gruen, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 175 days.

(21) Appl. No.: 18/398,872

(22) Filed: Dec. 28, 2023

(65) Prior Publication Data

US 2025/0218104 A1 Jul. 3, 2025

(51) Int. Cl.
*G06T 15/06* (2011.01)
*G06T 15/08* (2011.01)
*G06T 17/20* (2006.01)

(52) U.S. Cl.
CPC .............. *G06T 15/06* (2013.01); *G06T 15/08* (2013.01); *G06T 17/20* (2013.01); *G06T 2210/21* (2013.01)

(58) Field of Classification Search
None
See application file for complete search history.

(56) References Cited

U.S. PATENT DOCUMENTS 8,212,816 B1 * 7/2012 Hoberock ............... G06T 15/06 345/426
2003/0179196 A1 * 9/2003 Hux ........................ G06T 17/00 345/424
2009/0167763 A1 7/2009 Waechter et al.
2010/0097372 A1 * 4/2010 Gies ........................ G06T 15/08 345/419
2014/0306959 A1 * 10/2014 Ozdas ................... G06T 15/506 345/424
2018/0315245 A1 * 11/2018 Patel ....................... G06T 15/50
2020/0211267 A1 7/2020 Rowley et al.
2022/0207690 A1 * 6/2022 Burns ..................... G06T 15/06
2023/0078932 A1 3/2023 Burgess et al.
2023/0081791 A1 * 3/2023 Burgess .................. G06T 17/10 345/418

(Continued)

FOREIGN PATENT DOCUMENTS

WO WO-2023225754 A1 * 11/2023 ............. G06T 15/08

OTHER PUBLICATIONS

International Search Report and Written Opinion in PCT Application No. PCT/US2024/033890 mailed Oct. 11, 2024, By: Authorized Officer: Jeong Rok Yang.

*Primary Examiner* — Andrew G Yang
(74) *Attorney, Agent, or Firm* — Greenberg Traurig, LLP

(57) ABSTRACT

A device that defines and uses a bounding volume for testing for ray intersections with a displaced micro-mesh. The bounding volume is indirectly based on a twisted prism composed of two triangles and three bilinear patches that bounds the displaced micro-mesh. Instead of detecting intersection with the bilinear patches directly, tetrahedrons that circumscribe the bilinear patches can be used instead. The two bases and the three tetrahedra make fourteen triangles. The device tests for potential intersection with the displaced micro-mesh by testing for an intersection with any of the fourteen triangles. Various other methods and systems are also disclosed.

20 Claims, 8 Drawing Sheets

(56) References Cited

U.S. PATENT DOCUMENTS

| | | | | |
|---|---|---|---|---|
| 2023/0206544 | A1 | 6/2023 | Shkurko | |
| 2025/0131653 | A1* | 4/2025 | Langtind | G06T 17/20 |
| 2025/0166280 | A1* | 5/2025 | Thonat | G06T 17/20 |

* cited by examiner

400

SYSTEMS AND METHODS FOR DETECTING RAY INTERSECTIONS WITH DISPLACED MICRO-MESHES

BACKGROUND

Modern Graphics Processing Units (GPUs) can perform real-time ray tracing, providing more realistic and richer visuals to video games, interactive media, and other applications.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
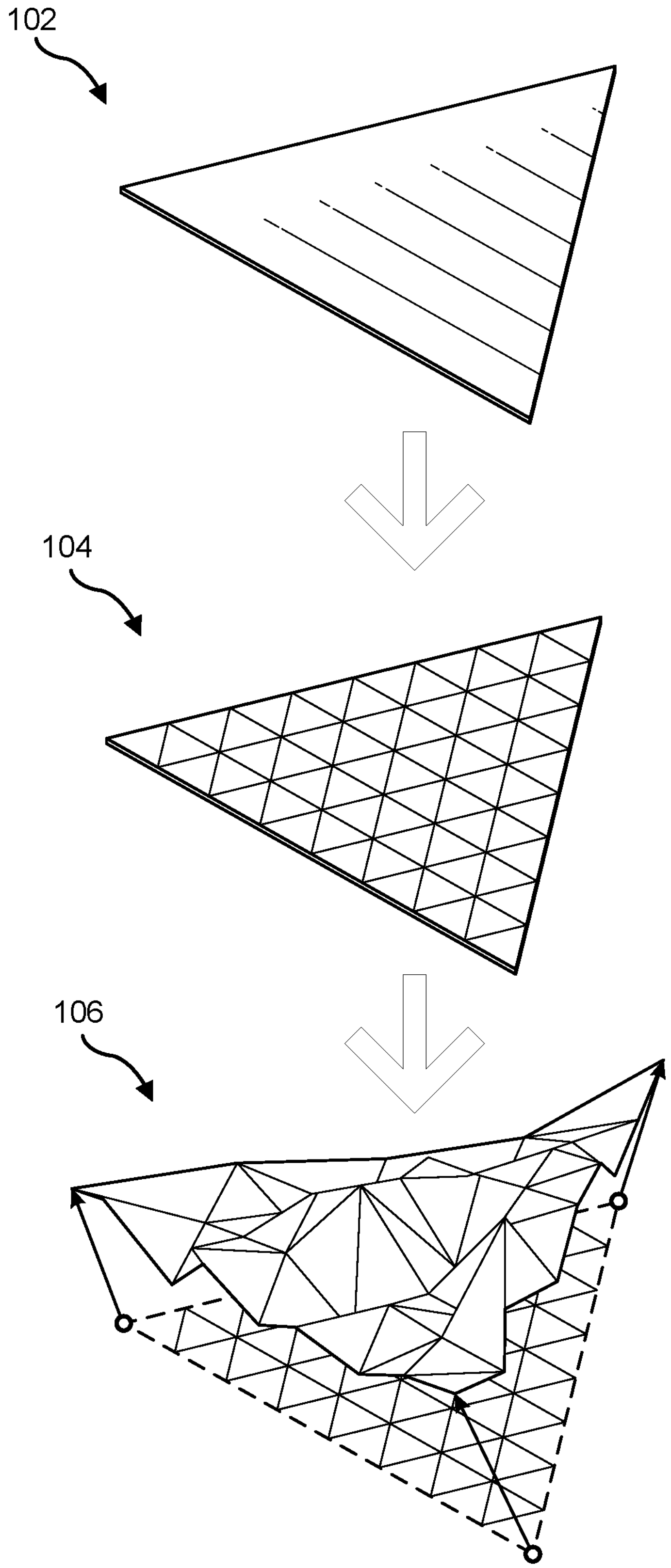
FIG. 1 is an illustration of an example displaced micro-mesh.

Throughout the drawings, identical reference characters and descriptions indicate similar, but not necessarily identical, elements. While the examples described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to detecting ray intersections with displaced micro-meshes (e.g., by a GPU to perform raytracing). Raytracing displaced micro-meshes (DMMs) can be expensive. The use of low-precision triangle prefiltering can reduce the cost of raytracing. Systems described herein can define a bounding volume for a displaced micro-mesh. The bounding volume can be indirectly based on a twisted prism composed of two triangles and three bilinear patches that bounds the displaced micro-mesh. However, instead of detecting intersection with the bilinear patches directly, tetrahedrons that circumscribe the bilinear patches can be used instead. The four triangles from each of three tetrahedrons (corresponding to the three bilinear patches) along with the two remaining triangles make 14 triangles. These 14 triangles are sufficient constitute a bounding volume that circumscribes the twisted prism along with some interior triangles that do not make a difference to detection. Thus, by detecting intersection with one of the 14 triangles using low-precision triangle prefiltering, systems described herein can efficiently and effectively perform raytracing with DMMs. Furthermore, these systems can perform computations using fixed-point integer math that errs on the side of effectively increasing the bounding volume.

The following will provide, with reference to FIGS. 1-4 detailed descriptions of example systems of example displaced micro-meshes and corresponding bounding volumes. Detailed descriptions of an example acceleration structure for detecting ray intersections with displaced micro-meshes will be provided in connection with FIG. 5. Detailed descriptions of an example system for detecting ray intersections with displaced micro-meshes will be provided in connection with FIG. 6.

A device can include logic circuitry configured to detect a potential intersection of a ray with a geometry. This detection is achieved by spotting an intersection of the ray with a bounding volume of the geometry. Constructing the bounding volume of the geometry includes defining at least one tetrahedron that bounds a corresponding curved surface of an intermediate bounding volume of the geometry.

In some examples, the corresponding curved surface includes a bilinear patch of the intermediate bounding volume.

In some examples, the geometry includes a mesh. In some examples, the mesh includes a displaced micro-mesh.

In some examples, the intermediate bounding volume can include a twisted triangular prism. At least one of the lateral faces of this twisted triangular prism includes a bilinear patch.

In some examples, detecting the intersection of the ray with the bounding geometry can include checking whether the ray intersects with a face of a tetrahedron that bounds the bilinear patch. This tetrahedron face also happens to be a face of the bounding volume of the geometry.

In some examples, the detection of whether the ray intersects with a face of the tetrahedron that bounds the bilinear patch (which is a face of the bounding volume of the geometry) involves checking if the ray intersects with any face of the tetrahedron.

In some examples, the intermediate geometry can include a twisted triangular prism. This prism consists of two triangular bases and three bilinear patches. The bounding geometry includes a set of fourteen triangles. These triangles consist of the two triangular bases and, for each of the three bilinear patches, every face of a tetrahedron is constructed from the vertices of that bilinear patch. The detection of the ray's intersection with the bounding volume of the geometry involves determining if the ray intersects with any of these fourteen triangles.

In some examples, detecting the intersection of the ray with the bounding volume of the geometry can include executing a fixed-point integer computation to discern the ray's intersection. The imprecision of this fixed-point integer computation is configured to err towards confirming the intersection.

In some examples, the logic circuitry is also configured to detect whether the ray actually intersects with the geometry once it detects a potential intersection of the ray with the bounding volume of the geometry.

In some examples, the logic circuitry is additionally configured to receive a signal. This signal requests the detection of the potential intersection of the ray with the geometry as a component of a ray tracing procedure.

In some examples, after detecting the intersection of the ray with the bounding volume of the geometry, the logic circuitry is further configured to transmit a signal indicating this potential intersection.

A computer-implemented method can include detecting a potential intersection of a ray with a geometry by spotting an intersection of the ray with a bounding volume of the geometry. The construction of the bounding volume of the geometry involves defining at least one tetrahedron that bounds a corresponding curved surface of an intermediate bounding volume of the geometry.

In some examples, the corresponding curved surface can include a bilinear patch of the intermediate bounding volume.

In some examples, the geometry includes a displaced micro-mesh.

In some examples, the intermediate bounding volume can include a twisted triangular prism, where at least one of its lateral faces includes a bilinear patch.

In some examples, detecting the intersection of the ray with the bounding geometry can involve determining whether the ray intersects with a face of a tetrahedron. This tetrahedron bounds the bilinear patch and is a face of the bounding volume of the geometry.

Detecting whether the ray intersects with a face of the tetrahedron (that bounds the bilinear patch and is a face of the bounding volume of the geometry) can involve identifying if the ray intersects with any face of the tetrahedron.

In some examples, the intermediate geometry contains a twisted triangular prism. This prism is composed of two triangular bases and three bilinear patches for the lateral faces of the prism. The bounding geometry consists of a set of fourteen triangles. These triangles include the two triangular bases and, for each of the three bilinear patches, every face of a tetrahedron constructed from the vertices of that bilinear patch. The process of detecting the intersection of the ray with the bounding volume of the geometry includes determining if the ray intersects with any of these fourteen triangles.

A system can include a command processor. This processor is configured to receive a ray tracing command and, in response to this command, direct one or more shader cores with at least one ray tracing task. These shader cores are equipped to define a ray in line with the ray tracing task. The shader cores detect a potential intersection of the ray with a geometry by identifying an intersection of the ray with a bounding volume of the geometry. Constructing the bounding volume of the geometry involves defining at least one tetrahedron that bounds a corresponding curved surface of an intermediate bounding volume of the geometry.

FIG. 1 is an illustration of an example displaced micro-mesh. As used herein, the term "mesh" generally refers to any set of faces (e.g., polygons, such as triangles, defined in a three-dimensional space according to, e.g., the locations of one or more vertices and/or edges) that together define a three-dimensional geometry. In some examples, a mesh can include a contiguous set of faces (e.g., where each face shares at least one edge with another face in the same contiguous mesh of faces).

As used herein, the term "geometry" generally refers to any data-based representation of a shape and/or structure that can be rendered by a GPU.

As used herein, the term "micro-mesh" generally refers to any mesh that is defined relative to and/or derived from a single face and/or that is approximately two-dimensionally bounded by a single face when projected onto a two-dimensional plane. As used herein, the term "displaced micro-mesh" generally refers to any mesh that is defined by and/or derived from a single face by dividing the face into smaller constituent faces and altering the locations of one or more vertices of the constituent faces according to one or more displacement vectors. In some examples, a displaced micro-mesh can be a mesh of smaller triangles defined relative to an original larger triangle.

While, for convenience, various systems described herein can be referred to as a "GPU," generally, "GPU" as used herein can equally refer to any hardware accelerator that can detect ray intersections with one or more surfaces (e.g., with displaced micro-meshes).

As used herein, the term "hardware accelerator" can refer to any hardware component and/or logic circuitry adapted to efficiently perform specific computational tasks (e.g., as directed by and, thus, effectively offloaded from, a more general-purpose processor). In various examples, a hardware accelerator can be embedded within a system-on-chip (SoC), exist as a discrete component on a motherboard, or be part of a larger system infrastructure. Examples of hardware accelerators include, without limitation, GPUs, Tensor Processing Units (TPUs), Digital Signal Processors (DSPs), Field-Programmable Gate Arrays (FGPAs), and Application-Specific Integrated Circuits (ASICs).

As shown in FIG. 1, a GPU can define, represent, process, and/or render a triangle 102. In some examples, triangle 102 can be part of a larger geometry (e.g., part of the surface of a model of a cat). In some examples, one or more systems described herein can decompose and/or divide a face such as triangle 102 into a mesh of smaller faces, such as a mesh 104. In addition, in some examples, systems described herein can define a displaced micro-mesh 106. For example, these systems can define, modify, represent, process, and/or render displaced micro-mesh 106 by displacing one or more of the vertices of mesh 104 (e.g., applying displacement vectors to vertices of mesh 104) to result in displaced micro-mesh 106.

In some examples, by defining displaced micro-mesh 106 from triangle 102, systems described herein can provide a more detailed and fine-grained geometry. For example, in the example in which triangle 102 is part of the surface of a model of a cat, displaced micro-mesh 106 can provide greater detail to the shape of the cat. In some examples, systems described herein can use displaced micro-mesh 106 in place of triangle 102. In some examples, systems described herein can use displaced micro-mesh 106 in place of triangle 102 for specific purposes. For example, a model of an object including triangle 102 can be used for a physics engine that models the behavior of the object in an environment while systems described herein can use displaced micro-mesh 106 for raytracing operations.

As used herein, the term "ray tracing" can refer to any process or technique for determining the path of a ray traversing a modeled environment and, in some examples, the interaction of the ray with one or more objects within the modeled environment. In some examples, ray tracing can determine with what object or objects in the modeled environment the ray intersects.

In some examples, ray tracing can simulate rays of light interacting with objects (such as to, e.g., eventually project an image to a virtual viewer, which can be displayed to a user of a computing system). Thus, for example, ray tracing can capture effects such as illumination, reflections, and refractions by tracing the path of rays.

In some examples, ray tracing can include, for each pixel of a final rendered image, casting one or more rays into a scene. An initial ray can determine color based on where it intersects with objects and how light interacts at that intersection point. Some effects, such as reflections or refractions, can arise by recursively casting additional rays from the intersection point.

In some examples, for each ray cast, systems described herein can perform intersection tests with scene geometry. In some examples, these systems can accelerate these intersection tests by using data structures such as bounding volume hierarchies (i.e., a tree-like structure with nested bounding volumes). As used herein, the term "bounding volume" can refer to any volume that encloses one or more geometries. In some examples, testing for an intersection with a bounding volume can determine whether a ray potentially intersects with any geometry within the bounding volume (i.e., if the ray does not intersect with the bounding volume, then the possibility of the ray intersecting with any geometry within the bounding volume is eliminated). This can allow fewer intersection tests to be conducted and/or can allow for simpler intersection tests to be conducted.

Figure 2:
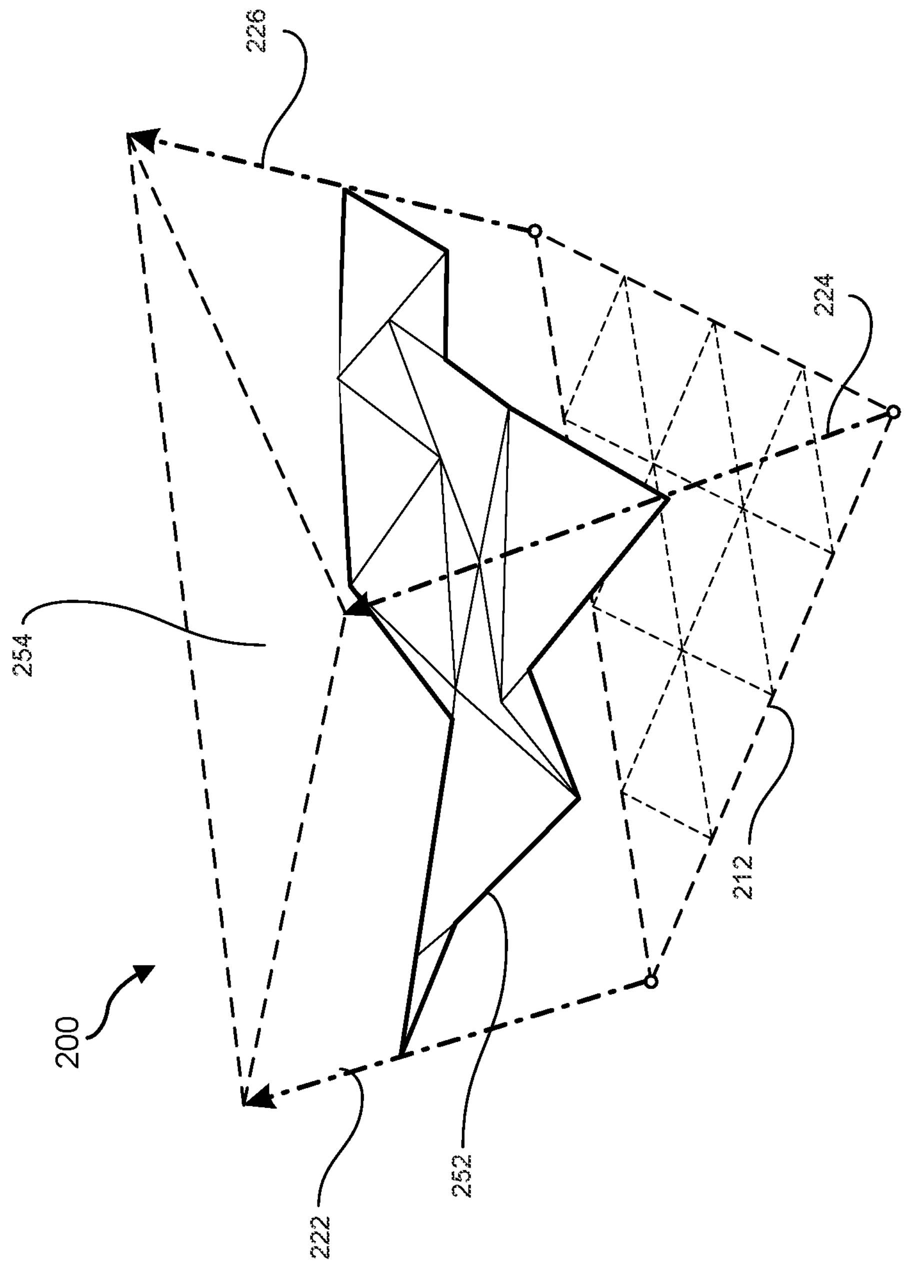
FIG. 2 is an illustration of an example twisted prism bounding a displaced micro-mesh.

FIG. 2 is an illustration of an example twisted prism bounding a displaced micro-mesh. As shown in FIG. 2, a twisted prism 200 can bound a displaced micro-mesh 252. As used herein, the term "twisted prism" can refer to any prism where one or more of the lateral sides of the prism is not a flat surface. For example, edges 222 and 224 of twisted prism 200 can be not parallel. Similarly, edges 224 and 226 of twisted prism 200 can be not parallel. Likewise, edges 226 and 222 of twisted prism 200 can be not parallel. Accordingly, the lateral face of twisted prism 200 defined by edges 222 and 224 (along with edges of bases 212 and 254) can be a bilinear patch. Similarly, the lateral face of the twisted prism 200 defined by edges 224 and 226 can be a bilinear patch. Likewise, the lateral face of the twisted prism 200 defined by edges 226 and 222 can be a bilinear patch. As used herein, the term "bilinear patch" can refer to any quadrilateral where not all four vertices lie on a shared plane. Thus, a bilinear patch can have a curved surface.

While, in some examples, twisted prism 200 can be an efficient bounding volume for displaced micro-mesh 252, it can be appreciated that, in some examples, testing for an intersection between a ray and a bilinear patch can be relatively expensive (compared to, e.g., testing for an intersection between a ray and a triangle). Accordingly, as will be explained in greater detail below, while systems described herein can use twisted prism 200 as an intermediate bounding volume, these systems can simplify twisted prism 200 for purposes of intersection testing, rather than testing intersections with twisted prism 200 itself. As used herein, the term "intermediate bounding volume" can refer to any volume that can be used as an intermediate representation of a bounding volume and/or that can underpin the formulation of a bounding volume without being directly used as a bounding volume. Thus, a bounding volume that is directly used in intersection tests can approximate an intermediate bounding volume that is not directly used in intersection tests.

Figure 3:
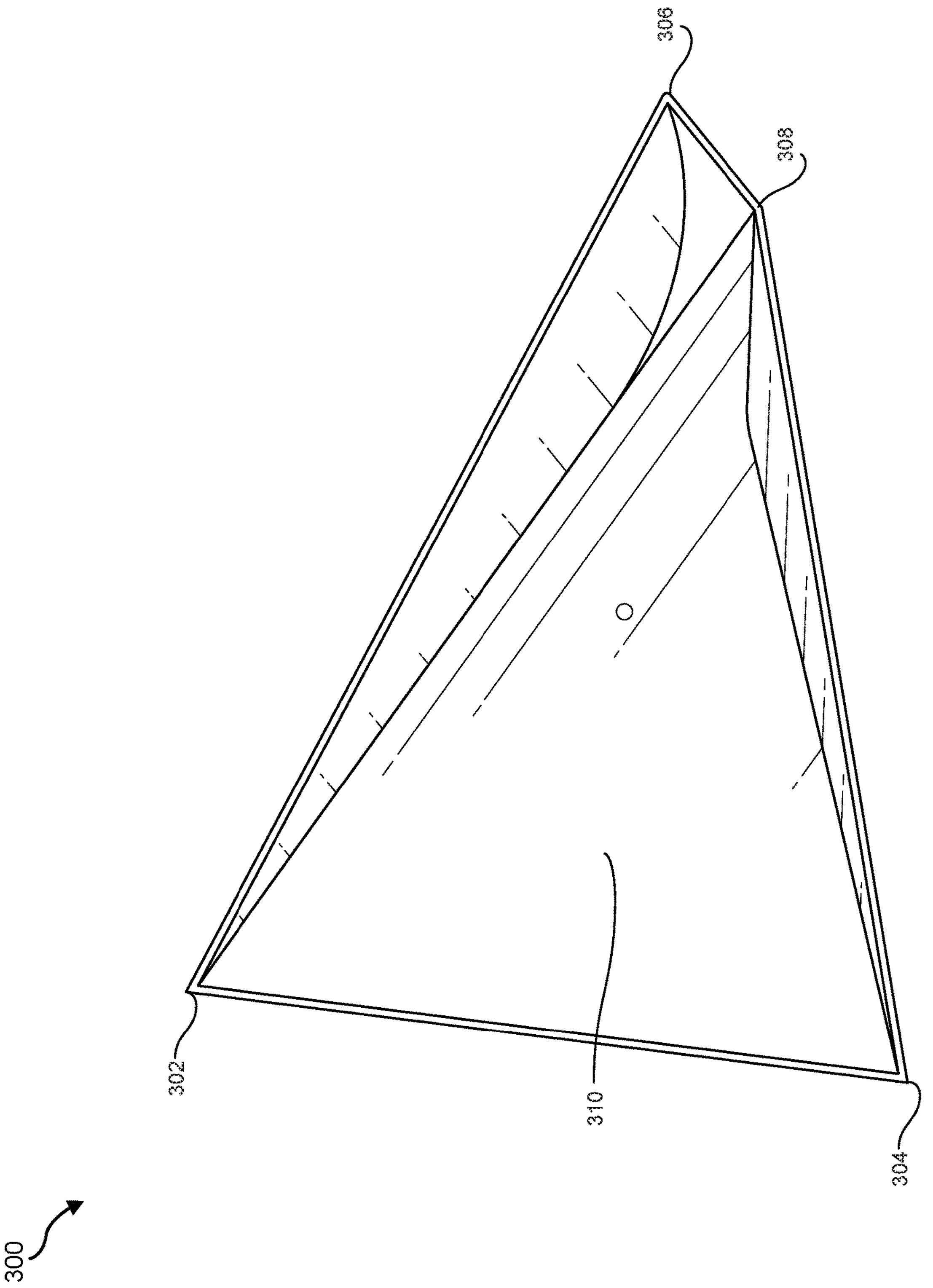
FIG. 3 is an illustration of an example bilinear patch bounded by a tetrahedron.

FIG. 3 is an illustration of an example bilinear patch 310 bounded by a tetrahedron 300. As shown in FIG. 3, the four corners of bilinear patch 310 can include vertices 302, 304, 306, and 308. Likewise, the four vertices of tetrahedron 300 can include vertices 302, 304, 306, and 308. In some examples, systems described herein may, for purposes of determining a bounding volume, use a tetrahedron in place of a bilinear patch (e.g., a tetrahedron may be constructed from the vertices of the bilinear patch). For example, a bilinear patch can be part of an intermediate bounding volume that conceptually bounds a geometry but that is not necessarily used in intersection tests. As an example, bilinear patch 310 can correspond to one of the bilinear patches discussed above with respect to FIG. 2. By using tetrahedra that circumscribe the bilinear patches rather than using the bilinear patches to construct the bounding volume, systems described herein can produce a bounding volume that is efficient while remaining accurate for testing for potential intersections with a displaced micro-mesh.

Figure 4:
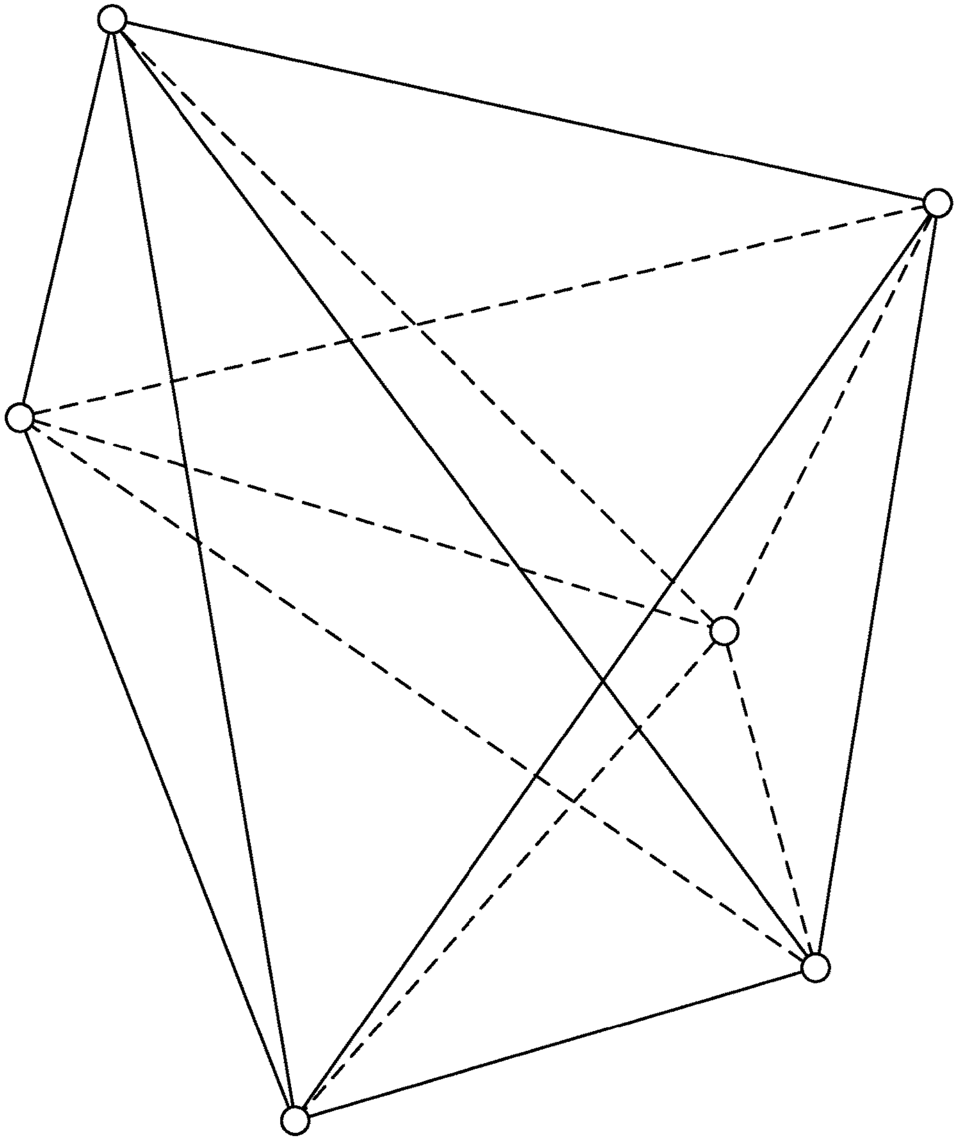
FIG. 4 is an illustration of an example bounding volume for a displaced micro-mesh.

FIG. 4 is an illustration of an example bounding volume 400 for a displaced micro-mesh. As shown in FIG. 4, systems described herein can construct bounding volume 400 from a twisted prism by replacing each bilinear patch on the lateral faces of the twisted prism with a tetrahedron that circumscribes the bilinear patch. Thus, bounding volume 400 can include fourteen triangles: two bases, and four triangles for each of three tetrahedra (each tetrahedron having replaced one of three bilinear patches). Thus, systems described herein can detect for an intersection between a ray and a displaced micro-mesh bounded by bounding volume 400 by first testing for an intersection with the fourteen triangles of bounding volume 400. If there is no intersection with any of the fourteen triangles (and, thus, of bounding volume 400), then these systems can determine that there is no intersection with the bounded displaced micro-mesh without further tests. If there is an intersection with bounding volume 400, then these systems can perform one or more additional intersection tests to determine whether there is an intersection with the displaced micro-mesh (and, more specifically, with which triangle or triangles of the displaced micro-mesh there is an intersection).

In some examples, one or more of the fourteen triangles of bounding volume 400 can be an interior triangle that, itself, is completely bounded by the remaining triangles of bounding volume 400 (e.g., one or more triangles composing the tetrahedra forming part of bounding volume 400). Thus, in principle, testing for the intersection between a ray and bounding volume 400 can be performed by testing for intersections between each of the exterior triangles of bounding volume 400 without testing for intersections with any interior triangle. In some examples, therefore, systems described herein can test for an intersection between the ray and one or more of the fourteen triangles of bounding volume 400 by testing for an intersection between the ray and the exterior triangles within the set of fourteen triangles. In other examples, systems described herein can simply test for an intersection for each of the fourteen triangles without first determining whether the triangle is an exterior triangle for bounding volume 400 (e.g., for simplicity of design and/or to avoid extra computational costs of determining whether a triangle is an exterior triangle or not).

Figure 5:
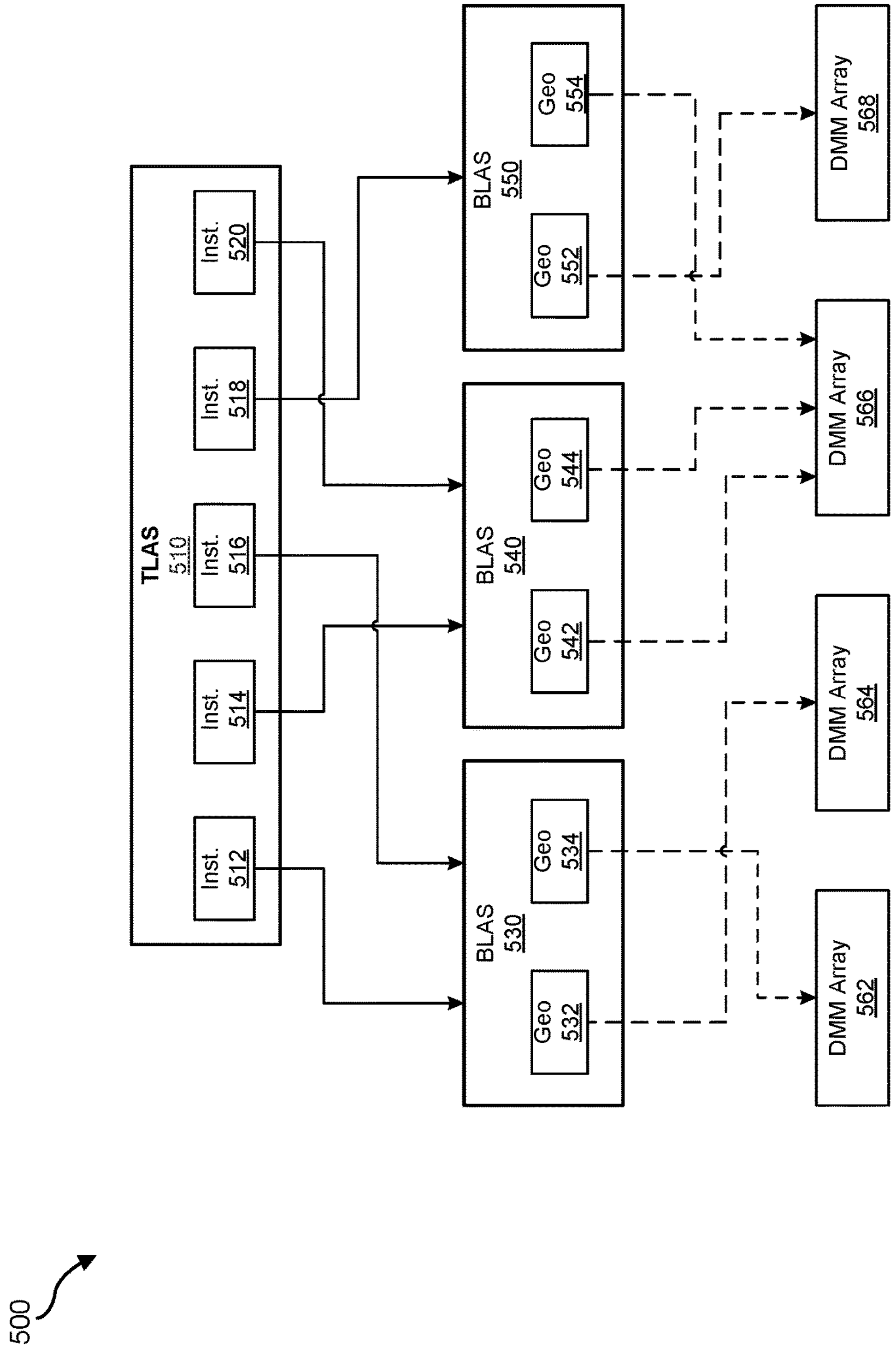
FIG. 5 is a block diagram of an example acceleration structure for detecting ray intersections with displaced micro-meshes.

FIG. 5 is a block diagram of an example acceleration structure 500 for detecting ray intersections with displaced micro-meshes. As shown in FIG. 5, acceleration structure 500 can include a Top-Level Acceleration Structure (TLAS) 510. TLAS 510 can contain instances 512, 514, 516, 518, and 520, each of which references a Bottom-Level Acceleration Structure (BLAS). For example, a BLAS 530 can include a geometry 532 and a geometry 534. A BLAS 540 can include a geometry 542 and a geometry 544. A BLAS 550 can include a geometry 552 and a geometry 554. Each of geometries 532, 534, 542, 544, 552, and 554 can reference one of DMM arrays 562, 564, 566, and 568. In some examples, a ray tracing procedure can include testing whether a ray intersects with any bounding volumes in TLAS 510. If the ray does intersect with a bounding volume in TLAS 510, the ray can be tested for intersection with intersections within a corresponding BLAS in a hierarchical fashion. Thus, portions of the geometry within the BLAS that the ray could not hit are culled. In some examples, these hierarchical tests can drill down to testing for an intersection with a bounding volume for a displaced micro-mesh, such as bounding volume 400 in FIG. 4. This test can be performed by determining whether there is an intersection between the ray and any of the fourteen triangles that compose the bounding volume. If there is no intersection, then the displaced micro-mesh, with all of its constituent triangles, is culled from further intersection testing. If there is an intersection, then the triangles of the displaced micro-mesh can be tested for intersection. In some examples, the above process can be performed recursively. For example, systems described herein can sub-divided the micro-mesh into multiple sub-meshes (e.g., 5 sub-meshes relative to the midpoints of the base triangle). Each of the sub-meshes, in turn, can be bounded by their own twisted prisms and the bounds can be tested for intersection as described above. Thus, these systems can produce an implicit bounding hierarchy that can be traversed until the sub-mesh contains few enough triangles to meet a threshold requirement, at which point direct ray intersection testing can be applied (e.g., using the same fixed-point integer operations and/or full-precision operations as for the 14 triangles of the bounding volume).

Figure 6:
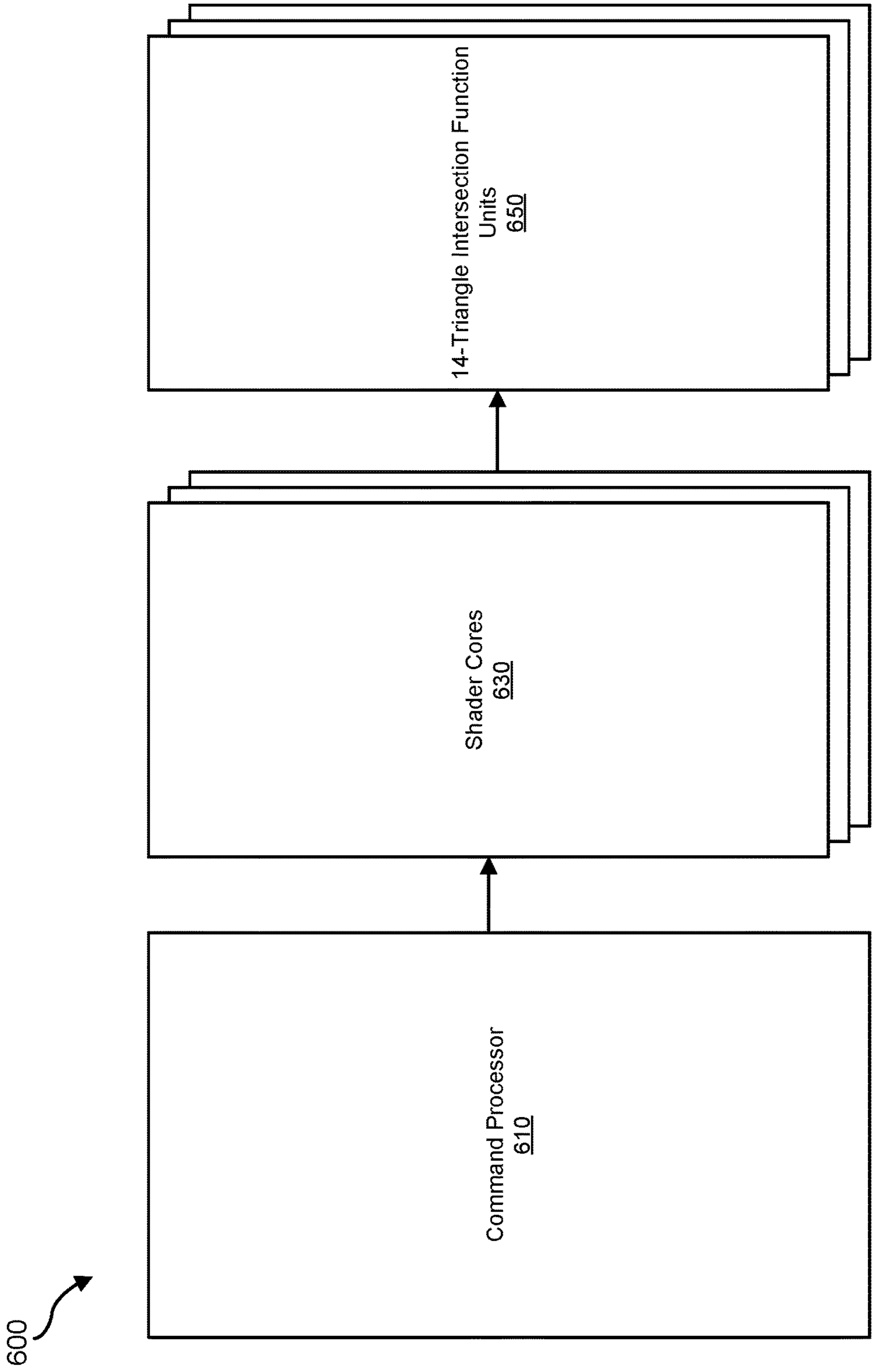
FIG. 6 is an example system for detecting ray intersections with displaced micro-meshes.

FIG. 6 is an example system 600 for detecting ray intersections with displaced micro-meshes. In some examples, system 600 may be implemented as a part of a co-processor, such as a GPU. As shown in FIG. 6, system 600 can include a command processor 610, one or more shader cores 630, and one or more 14-triangle intersection function units 650. Command processor 610 may be communicatively connected to shader cores 630 by way of one or more elements of control circuitry, logic circuitry, and/or memory elements of the GPU. For example, command processor 610 may place instructions into a command buffer that drives the execution of one or more compiled shaders by one or more of shader cores 630. Shader cores 630 may include and/or be communicatively coupled to 14-triangle intersection units 650. For example, one or more of shader cores 630 may execute an instruction perform a 14-triangle intersection test (and/or, e.g., to perform 14 separate triangle intersection tests), which instruction may be performed by one or more of 14-triangle intersection units 650. In one example, command processor 610 can receive an instruction for ray tracing a scene (e.g., from a general-purpose processor). Command processor 610 can then structure the task and/or divide the task between one or more shader cores 630. In turn, shader cores 630 can, in the course of performing intersection tests, use one or more of 14-triangle intersection function units 650 to test for whether a ray intersects with any of fourteen triangles making up a bounding volume for a displaced micro-mesh. In some examples, 14-triangle intersection function units 650 can be hardware specifically optimized for testing whether a ray intersects with any of 14 triangles (e.g., simply returning a binary result for the entire set of 14 triangles). 14-triangle intersection function units 650 can include any suitable type of logic circuit capable of detecting the intersection of a ray with one or more triangles. By way of example, without limitation, 14-triangle intersection function units 650 can include a circuit implementing a Möller-Trumbore ray-triangle intersection algorithm, a Plücker coordinates ray-triangle intersection algorithm, a barycentric ray-triangle intersection algorithm, or a shear mapping ray-triangle intersection algorithm.

As used herein, the term "command processor" can refer to any module and/or component of a hardware accelerator that manages the execution and/or flow of tasks within the hardware accelerator. For example, a command processor can dispatch one or more tasks to one or more execution units within the hardware accelerator. In some examples, a command processor can translate Application Programming Interface (API) calls to the hardware accelerator into hardware-level instructions before dispatching the instructions to one or more execution units. As used herein, the term "shader core" can refer to any module, component, and/or compute unit of a hardware accelerator that can perform one or more calculations and/or tests, including, e.g., ray intersection tests.

Figure 7:
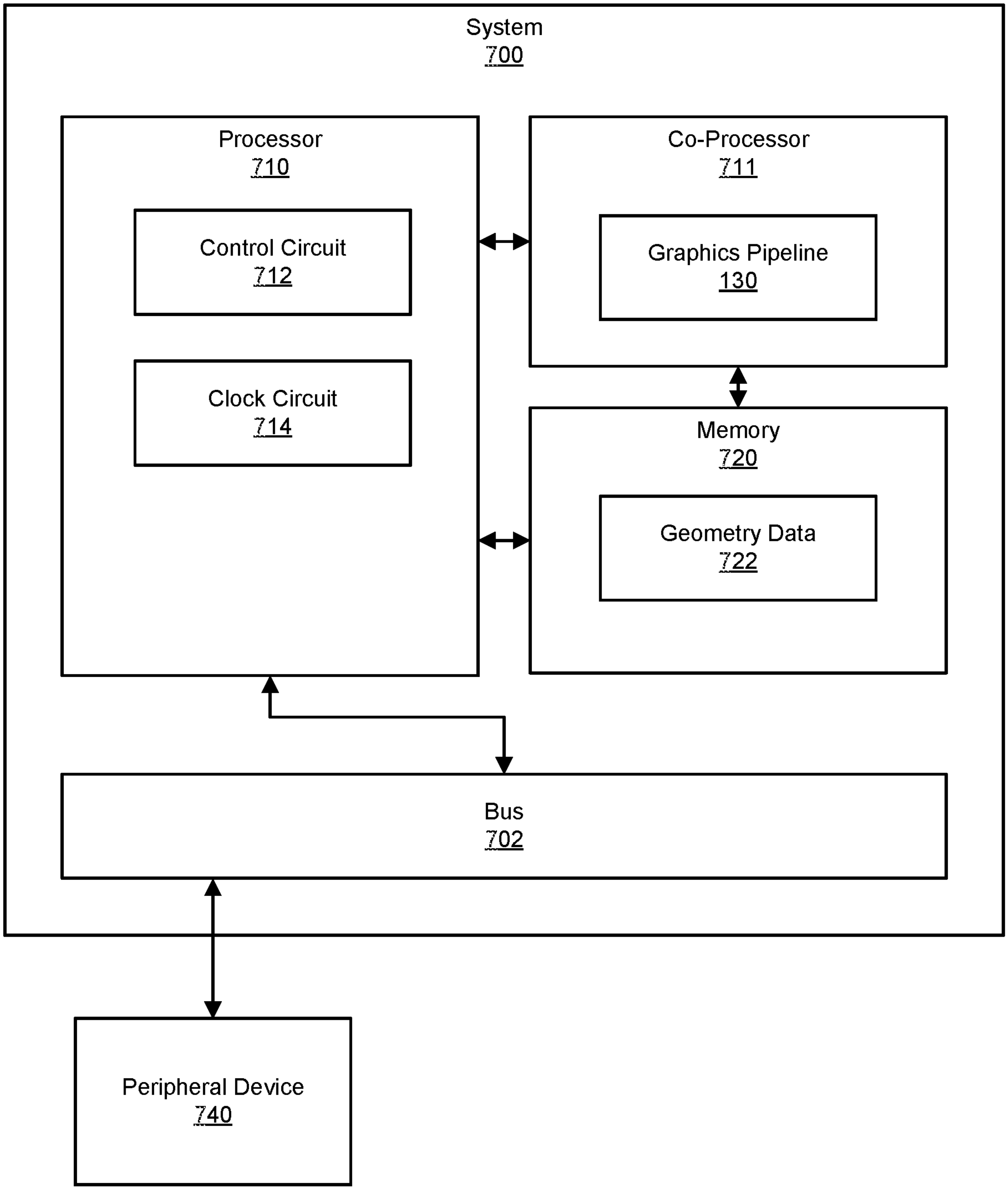
FIG. 7 is a block diagram of an example system for detecting ray intersections with displaced micro-meshes.

FIG. 7 is a block diagram of an example system 700 for detecting ray intersections with displaced micro-meshes. System 700 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 7, system 700 includes one or more memory devices, such as memory 720. Memory 720 generally represents any type or form of volatile or non-volatile storage device or medium capable of storing data and/or computer-readable instructions. Examples of memory 720 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 7, example system 700 includes one or more physical processors, such as processor 710. Processor 710 generally represents any type or form of hardware-implemented processing unit capable of interpreting and/or executing computer-readable instructions. In some examples, processor 710 accesses and/or modifies data and/or instructions stored in memory 720. Examples of processor 710 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As also illustrated in FIG. 7, example system 700 includes one or more physical co-processors, such as co-processor 711. Co-processor 711 generally represents any type or form of hardware-implemented processing unit capable of interpreting and/or executing computer-readable instructions, which in some examples works in conjunction and/or based on instructions from processor 710. In some examples, co-processor 711 accesses and/or modifies data and/or instructions stored in memory 720. Examples of co-processor 711 include, without limitation, chiplets (e.g., smaller and in some examples more specialized processing units that can coordinate as a single chip), microprocessors, microcontrollers, graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), massively parallel processors, single instruction multiple data (SIMD) processors, single instruction multiple threads (SIMT) processors, portions of one or more of the same, variations or combinations of one or more of the same, and/or any other suitable physical processor. In some examples, co-processor 711 can include system 600 of FIG. 6.

As further illustrated in FIG. 7, processor 710 includes a control circuit 712, and a clock circuit 714, and co-processor 711 includes a graphics pipeline 730. Control circuit 712 corresponds to circuitry (e.g., controllers) and/or instructions for detecting ray intersections with displaced micro-meshes as well as modulate system performance of system 700, as described herein. Clock circuit 714 corresponds to circuit for generating a clock signal, as used by system 700. A frequency of the clock signal (which can in some examples be controlled or otherwise modified by control circuit 712) can correspond to the system performance, for example a higher frequency corresponding to a higher performance (while increasing power consumption) and a lower frequency corresponding to a lower performance (while decreasing power consumption). Graphics pipeline 730 generally represents circuitry for rendering graphics (e.g., display frames) for outputting to a display, which can further correspond to one or more stages, including intermediary rendering states and associated data, for rendering graphics. Although FIG. 7 illustrates graphics pipeline 730 with co-processor 711 (e.g., a GPU), in other examples, graphics pipeline 730 can be physically separate from co-processor 711 (e.g., as part of a different instance of co-processor 711, and/or processor 710) and in some implementations be at least partially implemented with software (e.g., via processor 710 and/or memory 720).

FIG. 7 further illustrates geometry data 722 which can be stored in memory 720. In some examples, processor 710 and/or co-processor 711 can write geometry data 722 to memory 720 and/or can read geometry data from memory 720. In one example, geometry data 722 can include model data provided by processor 710 for processing to co-processor 711. Additionally or alternatively, geometry data 722 can include one or more displaced micro-meshes (e.g., corresponding to one or more shapes that are part of a surface of a model). Thus, for example, co-processor 711 can determine whether a ray intersects with a displaced micro-mesh represented within geometry data 722.

In addition, FIG. 7 illustrates a peripheral device 740 and a bus 702. Peripheral device 740 can correspond to an input device for receiving user inputs, such as a keyboard, mouse, touchscreen, virtual reality controller, etc., that can require an active user action/motion by a user to produce a user input signal for processing. Bus 702 can correspond to any bus, circuitry, connections, and/or any other communicative pathways for sending communicative signals between devices (e.g., peripheral device 740) and/or system 700 (e.g., processor 710, memory 720, and/or co-processor 711). Peripheral device 740 can, in some implementations, be external to system 700 and connected thereto via wired and/or wireless connections, although in other implementations peripheral device 740 can be at least partially integrated with system 700.

Figure 8:
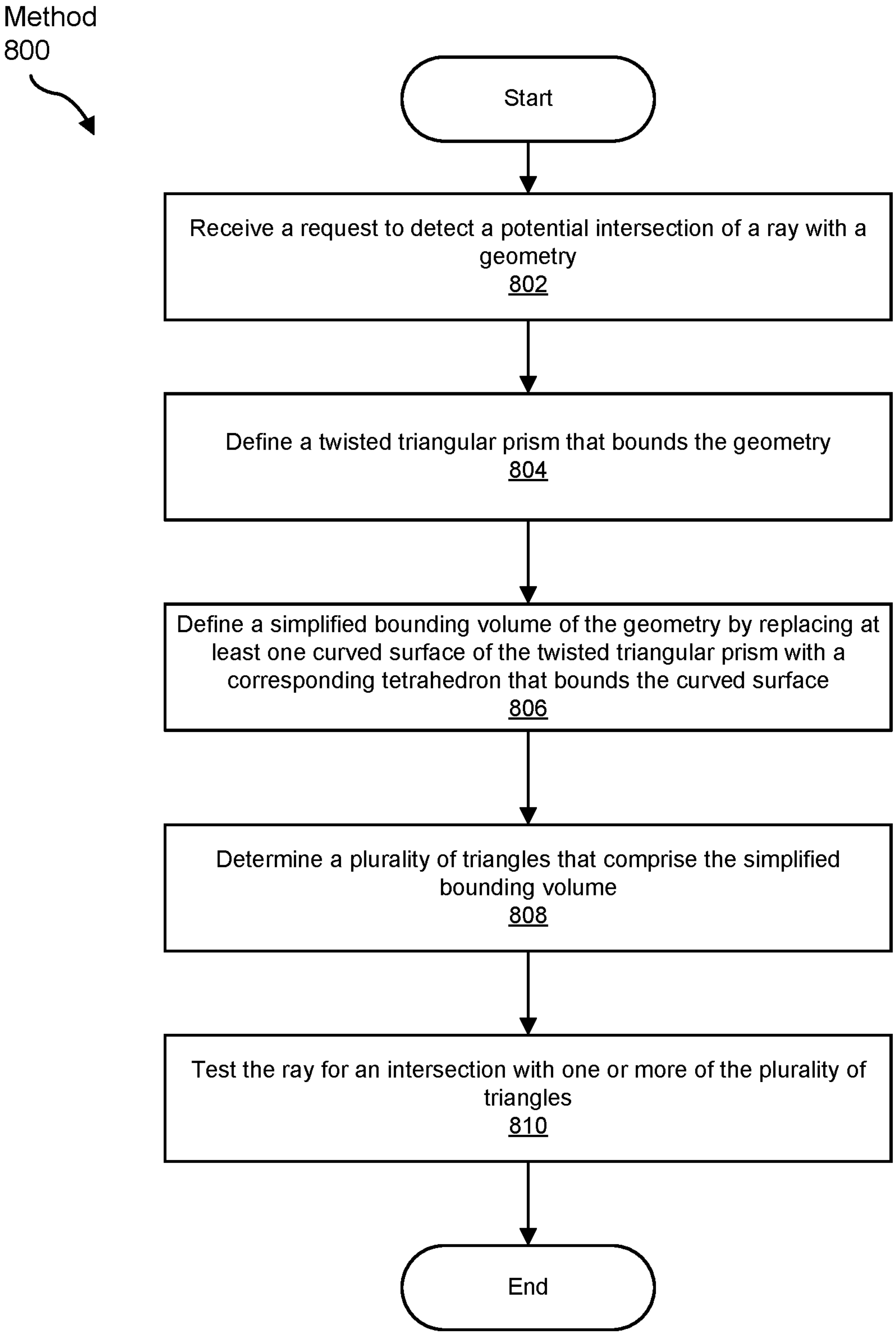
FIG. 8 is a flow diagram of an example method for detecting ray intersections with displaced micro-meshes.

FIG. 8 is a flow diagram of an example method 800 for detecting ray intersections with displaced micro-meshes. As shown in FIG. 8, at step 802 method 800 may include receiving a request to detect a potential intersection of a ray with a geometry. Systems described herein may perform step 802 in any of a variety of contexts. In some examples, a co-processor, such as a GPU, may receive a rendering instruction from a processor. For example, the GPU may receive an instruction to perform ray tracing (e.g., specifying one or more rays and one or more geometries) via an Application Programming Interface (API). In some examples, a command processor of the GPU (e.g., command processor 610 of FIG. 6) may receive the instruction to perform the ray tracing. The command processor may decode the instruction and, in some examples, may schedule a corresponding ray tracing task for execution. For example, the command processor may place a compiled shader program for ray tracing into a command queue.

In some examples, one or more subsystems and/or modules (e.g., one or more processors executing a GPU driver, the command processor, other GPU control logic, etc.) may populate a command buffer with the command queue. These subsystems and/or modules may dispatch tasks from the command buffer to one or more shader cores. These shader cores may generate the ray of step 802 and/or may detect a potential intersection between the ray and the geometry of step 802. Thus, receiving the request at step 802 may including receiving a request (including, e.g., by way of receiving an instruction and/or command) by a command processor receiving the request, by control logic receiving the request at a command queue and/or command buffer, by control logic receiving the request from the command buffer, and/or by one or more shader cores receiving the request.

Returning to FIG. 8, at step 804 one or more of the systems described herein may define a twisted triangular prism that bounds the geometry. These systems may define the twisted triangular prism in any suitable manner. For example, these systems may define the twisted triangular prism by defining the vertices of the twisted triangular prism. For example, these systems may define the vertices of the twisted triangular prism by defining the vertices of the two triangular bases of the twisted triangular prism. Thus, in various examples, these systems may not need to generate and/or store any specific information about the shape of the surfaces of the twisted triangular prism (including the curved surfaces) beyond what is logically implied by the vertices (and, e.g., a logical treatment of the vertices as relating in such a way as to define edges that, in turn, define the surfaces of the twisted triangular prism).

In some examples, the geometry may include a displaced micromesh. Accordingly, defining the twisted triangular prism may include selecting vertices of a twisted triangular prism that bounds the displaced micromesh. In some examples, selecting the vertices may include projecting the vertices of a base triangle from which the displaced micromesh is derived to produce an additional triangle is parallel to the base triangle and that clears the greatest displacement of the displaced micromesh (e.g., whose distance from the base triangle is equal to or greater than the greatest degree of displacement of any vertex of the displaced micromesh).

Defining the twisted triangular prism that bounds the geometry may be performed by any suitable subsystem and/or module. In some examples, one or more shader cores may define the twisted triangular prism.

Returning to FIG. 8, at step 806 one or more of the systems described herein may define a simplified bounding volume of the geometry by replacing at least one curved surface of the twisted triangular prism with a corresponding tetrahedron that bounds the curved surface. In some examples, the curved surface and the corresponding tetrahedron may have the same vertices. Accordingly, replacing the curved surface with the corresponding tetrahedron may involve interpreting the vertices as defining a set of four triangles (e.g., rather than as defining a bilinear patch). Thus, by deriving a set of triangles from the vertices of the curved surface by treating the vertices of the curved surface as vertices of a tetrahedron, the systems described herein may define the simplified bounding volume.

Defining the simplified bounding volume of the geometry may be performed by any suitable subsystem and/or module. In some examples, one or more shader cores may define the simplified bounding volume.

Returning to FIG. 8, at step 808 one or more of the systems described herein may determine a plurality of triangles that comprise the simplified bounding volume. For examples, these systems may, from the four vertices of a tetrahedron that acts as the simplified bounding volume, identify four triangles. These systems may identify the four triangles in any suitable manner. For example, given four vertices of a tetrahedron, four triangles may be defined simply by identifying each combination of three vertices out of the four vertices, resulting in four combinations (e.g., each combination excluding one of the four vertices).

Determining the plurality of triangles may be performed by any suitable subsystem and/or module. In some examples, one or more shader cores may determine the plurality of triangles. Additionally or alternatively, specific logic circuitry may receive the four vertices as input and produce the plurality of triangles (e.g., the various combinations of three vertices) as output.

Returning to FIG. 8, at step 810 one or more of the systems described herein may test the ray for an intersection with one or more of the plurality of triangles. For example, one or more shader subroutines executed by one or more shader cores and/or specific logic circuitry may test the ray for an intersection with one or more of the plurality of triangles. As mentioned earlier, such circuitry may perform ray-triangle intersection tests in any suitable manner, e.g., by implementing a Möller-Trumbore ray-triangle intersection algorithm, a Plücker coordinates ray-triangle intersection algorithm, a barycentric ray-triangle intersection algorithm, or a shear mapping ray-triangle intersection algorithm.

As many be appreciated, in some examples, the twisted triangular prism that bounds the geometry may include three curved surfaces (e.g., three bilinear patches). Thus, the systems described herein may have identified three corresponding tetrahedrons, each with four triangles. Between those twelve triangles and two additional triangles acting as the bases of the twisted triangular prism, the fourteen total triangles may act as a comprehensive bounding set of triangles (e.g., where an intersection with any of the triangles indicates a potential intersection with the geometry). Thus, for example, systems described herein may test the ray for an intersection with at least one of the set of fourteen triangles. In the case that there is no intersection with any of the fourteen triangles, these systems may determine that there is no intersection with the geometry. Where there is an intersection with one or more of the fourteen triangles, in some examples these systems may perform one or more additional ray tracing operations to determine a specific triangle within the geometry (e.g., within a displaced micro-mesh) with which the ray intersects.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 600 in FIG. 6 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 600 in FIG. 6 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 600 in FIG. 6 can be implemented within a virtual environment. For example, the modules and/or data described herein can reside and/or execute within a virtual machine. As used herein, the term "virtual machine" can generally refer to any operating system environment that is abstracted from computing hardware by a virtual machine manager (e.g., a hypervisor).

In some examples, all or a portion of example system 600 in FIG. 6 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:

a logic circuitry configured to:

construct an intermediate bounding volume of a geometry based on projecting a plurality of vertices of a base triangle derived from the geometry;

construct a bounding volume of the intermediate bounding volume by defining at least one tetrahedron that bounds a corresponding curved surface of the intermediate bounding volume of the geometry and replacing the curved surface with the at least one tetrahedron for the bounding volume; and detect a potential intersection of a ray with the geometry based on an intersection of the ray with the bounding volume of the intermediate bounding volume.

2. The device of claim 1, wherein the corresponding curved surface comprises a bilinear patch of the intermediate bounding volume.

3. The device of claim 1, wherein the geometry comprises a mesh.

4. The device of claim 3, wherein the mesh comprises a displaced micro-mesh.

5. The device of claim 4, wherein the intermediate bounding volume comprises a twisted triangular prism, wherein at least one lateral face of the twisted triangular prism comprises a bilinear patch.

6. The device of claim 5, wherein the logic circuitry is further configured to detect the intersection of the ray with the bounding volume at least in part by detecting whether the ray intersects with a face of a tetrahedron that bounds the bilinear patch and that is a face of the bounding volume of the geometry.

7. The device of claim 6, wherein detecting whether the ray intersects with a face of the tetrahedron that bounds the bilinear patch and that is a face of the bounding volume of the geometry comprises detecting whether the ray intersects with any face of the tetrahedron.

8. The device of claim 1, wherein:

an intermediate geometry comprises a twisted triangular prism comprising:

two triangular bases; and three bilinear patches;

the bounding volume comprises a set of fourteen triangles, comprising:

the two triangular bases; and for each of the three bilinear patches, each face of a tetrahedron constructed from vertices of that bilinear patch; and detecting the intersection of the ray with the bounding volume of the geometry comprises detecting the intersection of the ray with any of the set of fourteen triangles.

9. The device of claim 1, wherein detecting the intersection of the ray with the bounding volume of the geometry comprises performing a fixed-point integer computation to detect the intersection of the ray, wherein an imprecision of the fixed-point integer computation is configured to err towards detecting the intersection.

10. The device of claim 1, wherein the logic circuitry is further configured to, in response to detecting the potential intersection of the ray with the geometry by detecting the intersection of the ray with the bounding volume of the geometry, detect whether the ray intersects with the geometry.

11. The device of claim 1, wherein the logic circuitry is further configured to receive a signal requesting detection of the potential intersection of the ray with the geometry as a part of a ray tracing procedure.

12. The device of claim 1, wherein the logic circuitry is further configured to transmit a signal indicating the potential intersection of the ray with the geometry in response to detecting the intersection of the ray with the bounding volume of the geometry.

13. A computer-implemented method comprising:

constructing an intermediate bounding volume of a geometry based on projecting a plurality of vertices of a base triangle derived from the geometry;

constructing a bounding volume of the intermediate bounding volume by defining at least one tetrahedron that bounds a corresponding curved surface of the intermediate bounding volume of the geometry and replacing the curved surface with the at least one tetrahedron for the bounding volume; and detecting a potential intersection of a ray with the geometry based on an intersection of the ray with the bounding volume of the intermediate bounding volume.

14. The computer-implemented method of claim 13, wherein the corresponding curved surface comprises a bilinear patch of the intermediate bounding volume.

15. The computer-implemented method of claim 13, wherein the geometry comprises a displaced micro-mesh.

16. The computer-implemented method of claim 15, wherein the intermediate bounding volume comprises a twisted triangular prism, wherein at least one lateral face of the twisted triangular prism comprises a bilinear patch.

17. The computer-implemented method of claim 16, further comprising detecting the intersection of the ray with the bounding volume at least in part by detecting whether the ray intersects with a face of a tetrahedron that bounds the bilinear patch and that is a face of the bounding volume of the geometry.

18. The computer-implemented method of claim 17, wherein detecting whether the ray intersects with a face of the tetrahedron that bounds the bilinear patch and that is a face of the bounding volume of the geometry comprises detecting whether the ray intersects with any face of the tetrahedron.

19. The computer-implemented method of claim 13, wherein:

an intermediate geometry comprises a twisted triangular prism comprising:

two triangular bases; and three bilinear patches;

the bounding volume comprises a set of fourteen triangles, comprising:

the two triangular bases; and for each of the three bilinear patches, each face of a tetrahedron constructed from vertices of that bilinear patch; and detecting the intersection of the ray with the bounding volume of the geometry comprises detecting the intersection of the ray with any of the set of fourteen triangles.

20. A system comprising:

a command processor configured to:

receive a ray tracing command; and direct, in response to the ray tracing command, one or more shader cores with at least one ray tracing task; and the one or more shader cores, configured to:

define a ray in response to the at least one ray tracing task;

construct an intermediate bounding volume of a geometry based on projecting a plurality of vertices of a base triangle derived from the geometry;

construct a bounding volume of the intermediate bounding volume with a set of triangles by defining at least one tetrahedron that bounds a corresponding curved surface of the intermediate bounding volume of the geometry and replacing the curved surface with the at least one tetrahedron for the bounding volume; and detect a potential intersection of the ray with the geometry based on an intersection of the ray with at least one of the set of triangles of the bounding volume of the intermediate bounding volume.

* * * * *